(12) United States Patent
Teraoka et al.

(10) Patent No.: US 12,001,081 B2
(45) Date of Patent: Jun. 4, 2024

(54) CAMERA OPTICAL LENS

(71) Applicant: Changzhou Raytech Optronics Co., Ltd., Changzhou (CN)

(72) Inventors: Hiroyuki Teraoka, Osaka (JP); Takayuki Sakaguchi, Osaka (JP)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 573 days.

(21) Appl. No.: 17/227,400

(22) Filed: Apr. 12, 2021

(65) Prior Publication Data

US 2022/0260807 A1 Aug. 18, 2022

(30) Foreign Application Priority Data

Feb. 8, 2021 (JP) ................................. 2021-018578

(51) Int. Cl.
*G02B 9/64* (2006.01)
*G03B 30/00* (2021.01)
(52) U.S. Cl.
CPC ................ *G02B 9/64* (2013.01); *G03B 30/00* (2021.01)
(58) Field of Classification Search
CPC ...... G02B 9/64; G02B 13/0045; G02B 13/06; G02B 13/002; G03B 30/00

USPC ......................................................... 359/755
See application file for complete search history.

(56) References Cited

U.S. PATENT DOCUMENTS

| 2019/0121075 | A1* | 4/2019 | Sato | ................... | G02B 13/0045 |
| 2019/0278062 | A1* | 9/2019 | Chen | ....................... | G02B 9/64 |
| 2022/0196983 | A1* | 6/2022 | Dai | ........................ | G02B 9/64 |

* cited by examiner

*Primary Examiner* — Cara E Rakowski
*Assistant Examiner* — Jennifer A Jones
(74) *Attorney, Agent, or Firm* — W&G Law Group

(57) ABSTRACT

The present invention relates to a field of optical lens, and provides a camera optical lens including, from an object side to an image side in sequence: a first lens having a negative refractive power, a second lens having a positive refractive power, a third lens, a fourth lens having a negative refractive power, a fifth lens having a positive refractive power, a sixth lens, a seventh lens having a negative refractive power and provided with an image-side surface as a free-form surface; and the camera optical lens satisfies conditions of: |f2/f3|≤0.07; −0.50≤f2/f4≤−0.30; 0.58≤D12/f≤0.64; and 0.35≤D23/f≤0.45. The camera optical lens provided by the present disclosure has |TV_D|<1.0%, has excellent optical performance, is of wide angle with 2ω>110°, and includes seven lenses.

4 Claims, 10 Drawing Sheets

CAMERA OPTICAL LENS

TECHNICAL FIELD

The present disclosure relates to camera optical lens, particular, to a camera optical lens which is suitable for a camera module of a smart phone or a WEB camera using imaging elements such as Charge Coupled Device (CCD) or Complementary Metal-Oxide Semiconductor Sensor (CMOS sensor) for high pixel, etc., and is wide angle with a full viewing angle ("2ω" hereinafter) of more than 110 degrees, has a TV distortion whose absolute value ("|TV_D|" hereinafter) is less than 1.0%, has excellent optical performance and includes seven lenses.

BACKGROUND

In recent years, in various imaging devices using imaging elements such as CCD and CMOS, a camera optical lens of wide-angle having less TV distortion and excellent optical performance has been sought.

Development for a camera optical lens with |TV_D| less than 1.0%, having excellent optical performance, being of wide angle, and including seven lenses is being advanced. Chinese patent document with publication No. CN110221402A ("Patent Document 1" hereafter) provides such a camera optical lens including seven lenses, which are, from the object side to the image side in sequence: a first lens having a negative refractive power, a second lens having a positive refractive power, a third lens, a fourth lens having a negative refractive power and a fifth lens having a positive refractive power, a sixth lens, and a seventh lens having a negative refractive power.

In the camera optical lens disclosed in Embodiments 1, 2, 4, and 7 of Patent Document 1, a ratio of a focal length of the second lens to a focal length of the third lens, a ratio of a focal length of the second lens to a focal length of the fourth lens, and a ratio of an on-axis distance from an object-side surface of the first lens to an image-side surface of the second lens to a focal length of the camera optical lens are insufficient, resulting insufficient correction of distortion, and |TV_D|>1.0%.

SUMMARY

An objective of the present disclosure is to provide a camera optical lens with |TV_D|<1.0%, having excellent optical performance, being of wide angle with 2ω>110°, and including seven lenses.

In order to achieve the aforementioned objective, the present disclosure is conceived with a camera optical lens capable of solving the problem in the existing technology, by studying a ratio of a focal length of the second lens to a focal length of the third lens, a ratio of a focal length of the second lens to a focal length of the fourth lens, a ratio of an on-axis distance from an object-side surface of the first lens to an image-side surface of the second lens to a focal length of the camera optical lens, and a ratio of an on-axis distance from an object-side surface of the second lens to an image-side surface of the third lens to a focal length of the camera optical lens, and setting an image-side surface of the seventh lens as a free-form surface.

For solving the above technical problem, embodiments of the present disclosure provide a camera optical lens. The camera optical lens includes, from an object side to an image side in sequence: a first lens having a negative refractive power, a second lens having a positive refractive power, a third lens, a fourth lens having a negative refractive power, a fifth lens having a positive refractive power, a sixth lens, a seventh lens having a negative refractive power and provided with an image-side surface as a free-form surface; and the camera optical lens satisfies conditions of: $|f2/f3|\leq 0.07$; $-0.50\leq f2/f4\leq -0.30$; $0.58\leq D12/f\leq 0.64$; and $0.35\leq D23/f\leq 0.45$; where f denotes a focal length of the camera optical lens; f2 denotes a focal length of the second lens; f3 denotes a focal length of the third lens; f4 denotes a focal length of the fourth lens; D12 denotes an on-axis distance from an object-side surface of the first lens to an image-side surfaces of the second lens; and D23 denotes an on-axis distance from an object-side surface of the second lens to an image-side surface of the third lens.

As an improvement, the camera optical lens further satisfies a condition of: $-4.50\leq f7/f\leq -1.90$; where f7 denotes a focal length of the seventh lens.

As an improvement, the camera optical lens further satisfies a condition of: $0.90\leq v1/v2\leq 1.10$; where v1 denotes an abbe number of the first lens; and v2 denotes an abbe number of the second lens.

As an improvement, the camera optical lens further satisfies a condition of: $0.90\leq v3/v2\leq 1.10$; where v3 denotes an abbe number of the third lens; and v2 denotes the abbe number of the second lens.

The present disclosure is advantageous in as follows.

According to the present disclosure, the camera optical lens is provided, which is suitable for a camera module of a smart phone or a WEB camera using imaging elements such as Charge Coupled Device (CCD) or Complementary Metal-Oxide Semiconductor Sensor (CMOS sensor) for high pixel, etc., and which has |TV_D|<1.0%, has excellent optical performance, is of wide angle with 2ω>110°, and includes seven lenses.

BRIEF DESCRIPTION OF DRAWINGS

To illustrate the technical solutions according to the embodiments of the present disclosure or in the prior art more clearly, the accompanying drawings for describing the embodiments or the prior art are introduced briefly in the following. The accompanying drawings in the following description are only some embodiments of the present disclosure, and persons of ordinary skill in the art can derive other drawings from the accompanying drawings without creative efforts.

DETAILED DESCRIPTION OF EMBODIMENTS

The present disclosure will be further described with reference to the accompanying drawings and embodiments.

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
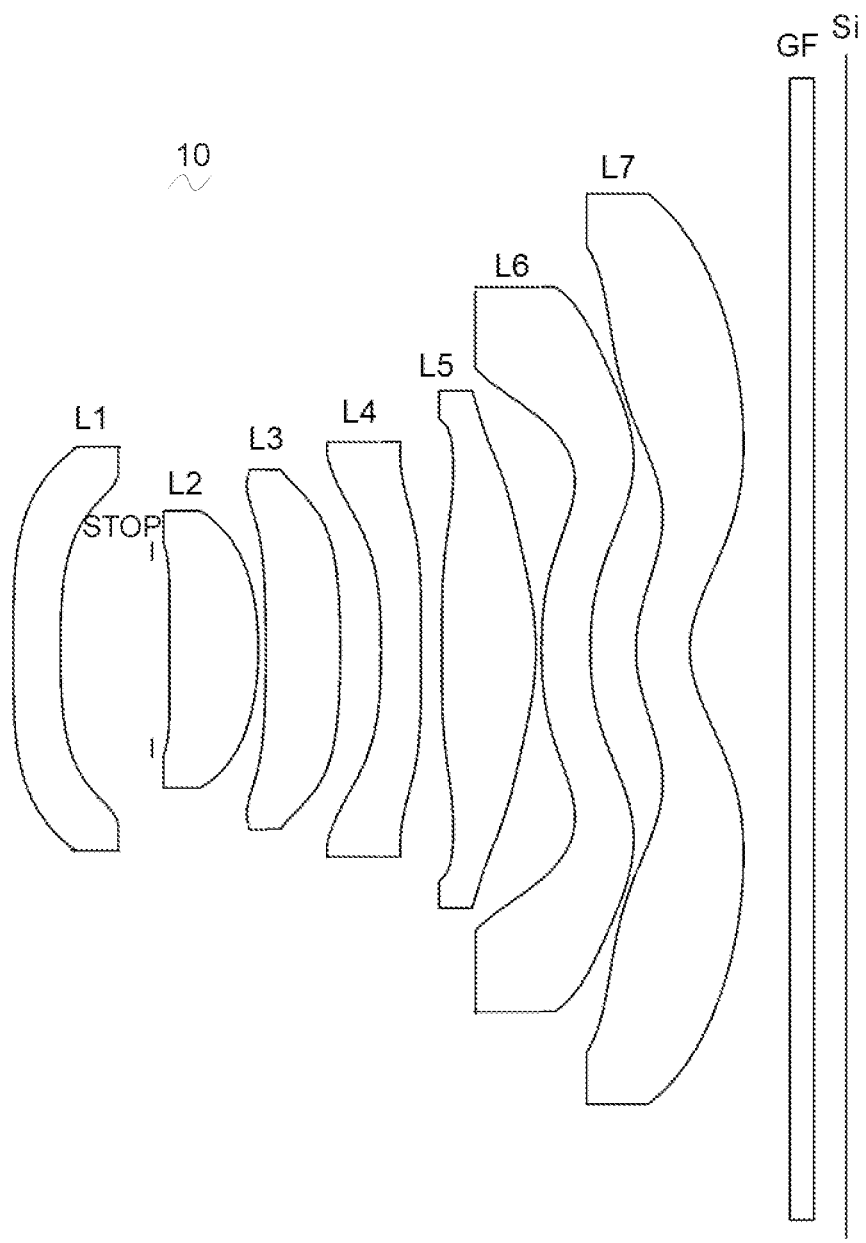
FIG. 1 is a schematic diagram of a structure of a camera optical lens according to Embodiment 1 of the present disclosure.
Figure 2:
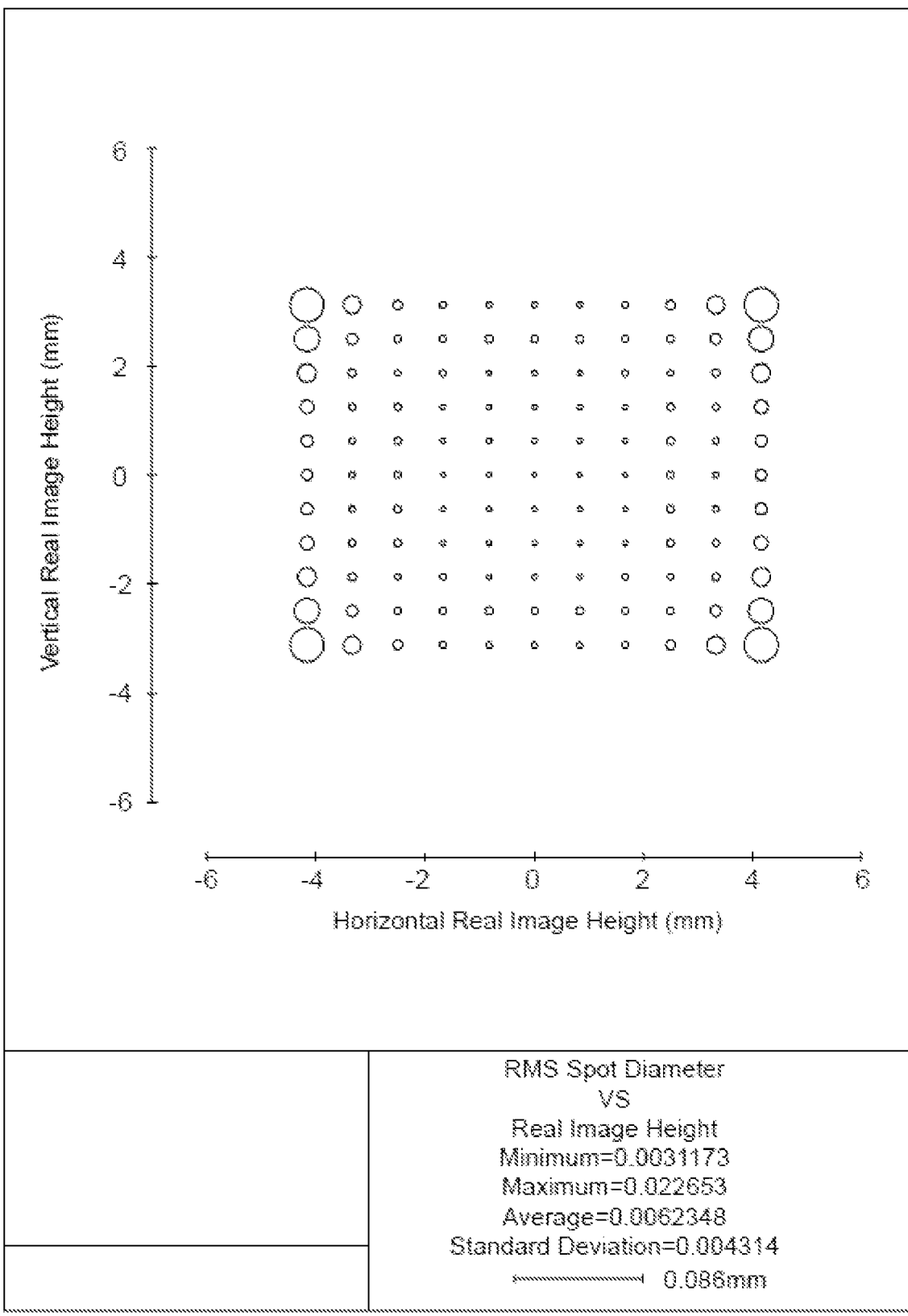
FIG. 2 is a schematic diagram showing diameters of RMS spots in various image heights of the camera optical lens according to Embodiment 1 of the present disclosure.
Figure 3:
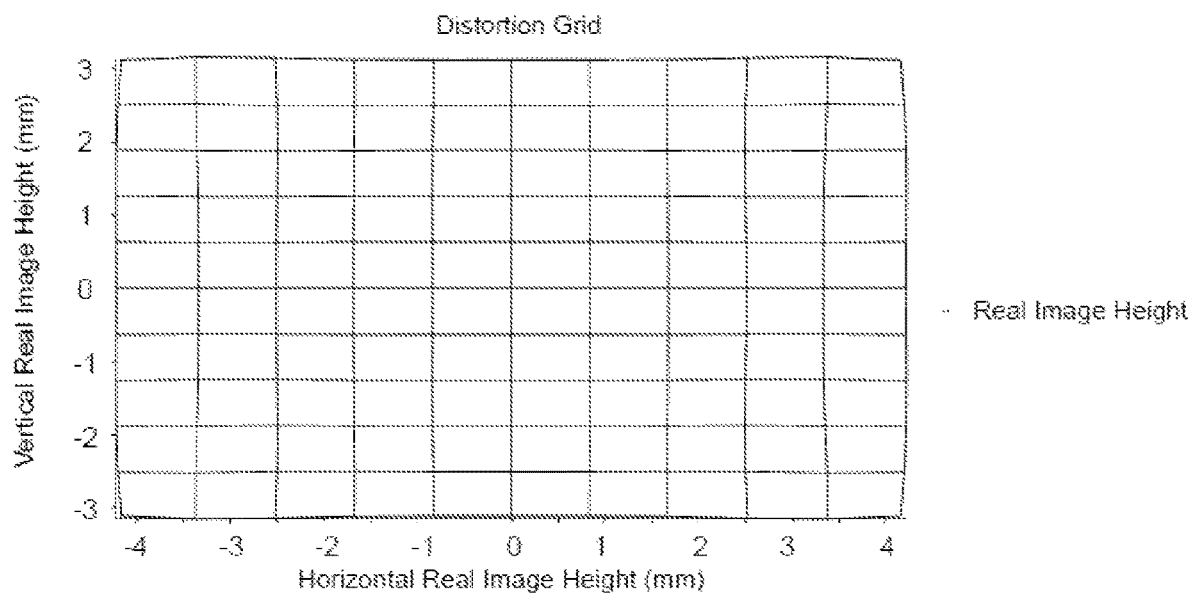
FIG. 3 is a schematic diagram of a distortion grid of the camera optical lens according to Embodiment 1 of the present disclosure.

Referring to FIGS. 1 to 3, the present disclosure provides a camera optical lens 10. In FIG. 1, the left side is referred to as an object side, and the right side is referred to as an image side. The camera optical lens has a lens system including seven lenses, in which, from the object side to the image side in sequence, a first lens L1, a second lens L2, a third lens L3, a fourth lens L4, a fifth lens L5, a sixth lens L6, and a seventh lens L7 are provided. A glass plate GF is disposed between the seventh lens L7 and an image surface Si. The glass plate GF may include glass cover plates, various filters, and the like. In the present disclosure, the glass plate GF may be disposed at different positions or may be omitted.

In this embodiment, the first lens L1 has a negative refractive power, the second lens L2 has a positive refractive power, the third lens L3 has a refractive power, the fourth lens L4 has a negative refractive power, the fifth lens L5 has a positive refractive power, the sixth lens L6 has a refractive power, and the seventh lens L7 has a negative refractive power. For better correction to various distortions, among the surfaces of the seven lenses, an object-side surface S1 of the first lens L1 to an object-side surface S13 of the seventh lens L7 are set as aspheric, and an image-side surface S14 of the seventh lens L7 is set as free-form.

The camera optical lens 10 satisfies a condition of:

$$|f2/f3| \leq 0.07 \quad (1)$$

Condition (1) specifies a ratio of a focal length f2 of the second lens L2 to a focal length f3 of the third lens L3. Within this condition, correction to various distortions is facilitated, and meanwhile development of the camera optical lens 10 towards wide angle under a condition of |TV_D|<1.0% is facilitated.

The camera optical lens 10 satisfies a condition of:

$$-0.50 \leq f2/f4 \leq -0.30 \quad (2)$$

Condition (2) specifies a ratio of a focal length f2 of the second lens L2 to a focal length f4 of the fourth lens L4. Within this condition, correction to various distortions is facilitated, and meanwhile development of the camera optical lens 10 towards wide angle under a condition of |TV_D|<1.0% is facilitated.

The camera optical lens 10 satisfies a condition of:

$$0.58 \leq D12/f \leq 0.64 \quad (3)$$

Condition (3) specifies a ratio of an on-axis distance D12 from the object-side surface S1 of the first lens L1 to an image-side surface S4 of the second lens L2 to a focal length f of the camera optical lens 10. Within this condition, correction to various distortions is facilitated, and meanwhile development of the camera optical lens 10 towards wide angle under a condition of |TV_D|<1.0% is facilitated.

The camera optical lens 10 satisfies a condition of:

$$0.35 \leq D23/f \leq 0.45 \quad (4)$$

Condition (4) specifies a ratio of an on-axis distance D23 from an object-side surface S3 of the second lens L2 to an image-side surface S6 of the third lens L3 to the focal length f of the camera optical lens 10. Within this condition, correction to various distortions is facilitated, and meanwhile development of the camera optical lens 10 towards wide angle under a condition of |TV_D|<1.0% is facilitated.

The camera optical lens 10 satisfies a condition of:

$$-4.50 \leq f7/f \leq -1.90 \quad (5)$$

Condition (5) specifies a ratio of a focal length f7 of the seventh lens L7 to the focal length f of the camera optical lens 10. Within this condition, correction to various distortions is facilitated, and meanwhile development of the camera optical lens 10 towards wide angle under a condition of |TV_D|<1.0% is facilitated.

The camera optical lens 10 satisfies a condition of:

$$0.90 \leq v1/v2 \leq 1.10 \quad (6)$$

Condition (6) specifies a ratio of an abbe number v1 of the first lens L1 to an abbe number v2 of the second lens L2. Within this condition, correction to various distortions is facilitated, and meanwhile development of the camera optical lens 10 towards wide angle under a condition of |TV_D|<1.0% is facilitated.

The camera optical lens 10 satisfies a condition of:

$$0.90 \leq v3/v2 \leq 1.10 \quad (7)$$

Condition (7) specifies a ratio of an abbe number v3 of the third lens L3 to the abbe number v2 of the second lens L2. Within this condition, correction to various distortions is facilitated, and meanwhile development of the camera optical lens 10 towards wide angle under a condition of |TV_D|<1.0% is facilitated.

With the seven lenses included in the camera optical lens 10 satisfying the aforementioned structure and conditions respectively, the camera optical lens 10 with |TV_D|<1.0%, having excellent optical performance, being of wide angle with 2ω>110°, and including seven lenses is obtained.

The camera optical lens 10 will be further described with reference to the following examples. Symbols used in various examples are shown as follows. It should be noted that the distance, central curvature radius, and on-axis thickness are all in units of mm.

f: a focal length of the camera optical lens;
f1: a focal length of the first lens L1;
f2: a focal length of the second lens L2;
f3: a focal length of the third lens L3;
f4: a focal length of the fourth lens L4;
f5: a focal length of the fifth lens L5;
f6: a focal length of the sixth lens L6;
f7: a focal length of the seventh lens L7;

FNO: ratio of an effective focal length and an entrance pupil diameter of the camera optical lens;
2ω: full viewing angle;
STOP: aperture;
IH: image height of the camera optical lens;
R: central curvature radius of an optical surface;
R1: central curvature radius of the object-side surface S1 of the first lens L1;
R2: central curvature radius of the image-side surface S2 of the first lens L1;
R3: central curvature radius of the object-side surface S3 of the second lens L2;
R4: central curvature radius of the image-side surface S4 of the second lens L2;
R5: central curvature radius of the object-side surface S5 of the third lens L3;
R6: central curvature radius of the image-side surface S6 of the third lens L3;
R7: central curvature radius of the object-side surface S7 of the fourth lens L4;
R8: central curvature radius of the image-side surface S8 of the fourth lens L4;
R9: central curvature radius of the object-side surface S9 of the fifth lens L5;
R10: central curvature radius of the image-side surface S10 of the fifth lens L5;
R11: central curvature radius of the object-side surface S11 of the sixth lens L6;
R12: central curvature radius of the image-side surface S12 of the sixth lens L6;
R13: central curvature radius of the object-side surface S13 of the seventh lens L7;
R14: central curvature radius of the image-side surface S14 of the seventh lens L7;
R15: central curvature radius of an object-side surface S15 of the glass plate GF;
R16: central curvature radius of an image-side surface S16 of the glass plate GF;
d: on-axis thickness of a lens or an on-axis distance between lenses;
d1: on-axis thickness of the first lens L1;
d2: on-axis distance from the image-side surface S2 of the first lens L1 to the aperture STOP;
d3: on-axis distance from the aperture STOP to the object-side surface S3 of the second lens L2;
d4: on-axis thickness of the second lens L2;
d5: on-axis distance from the image-side surface S4 of the second lens L2 to the object-side surface S5 of the third lens L3;
d6: on-axis thickness of the third lens L3;
d7: on-axis distance from the image-side surface S6 of the third lens L3 to the object-side surface S7 of the fourth lens L4;
d8: on-axis thickness of the fourth lens L4;
d9: on-axis distance from the image-side surface S8 of the fourth lens L4 to the object-side surface S9 of the fifth lens L5;
d10: on-axis thickness of the fifth lens L5;
d11: on-axis distance from the image-side surface S10 of the fifth lens L5 to the object-side surface S11 of the sixth lens L6;
d12: on-axis thickness of the sixth lens L6;
d13: on-axis distance from the image-side surface S12 of the sixth lens L6 to the object-side surface S13 of the seventh lens L7;
d14: on-axis thickness of the seventh lens L7;
d15: on-axis distance from the image-side surface S14 of the seventh lens L7 to the object-side surface S15 of the glass plate GF;
d16: on-axis thickness of the glass plate GF;
d17: on-axis distance from the image-side surface S16 of the glass plate GF to the image surface;
D12: on-axis distance from the object-side surface S1 of the first lens L1 to the image-side surface S4 of the second lens L2
D23: on-axis distance from the object-side surface S3 of the second lens L2 to the image-side surface S6 of the third lens L3;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
nd6: refractive index of the d line of the sixth lens L6;
nd7: refractive index of the d line of the seventh lens L7;
ndg: refractive index of the d line of the glass plate GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
vg: abbe number of the glass plate GF;
TTL: Total optical length (on-axis distance from the object side surface S1 of the first lens L1 to the image surface Si of the camera optical lens) in mm.

FIG. 1 is a schematic diagram of a structure of the camera optical lens 10 according to Embodiment 1 of the present disclosure. Table 1 shows the central curvature radii R of the object-side surfaces and the image-side surfaces of the camera optical lens 10 of the first lens L1 to the seventh lens L7, the on-axis thicknesses d of the lenses, the on-axis distances d between the lenses, the refractive indices nd and the abbe numbers v. Table 2 shows the conic coefficients k and the aspheric surface coefficients of the surfaces S1 to S13. Table 3 shows the conic coefficient k and the free-form surface coefficients of the surface S14. Table 4 shows values of 2ω, Fno, f, f1, f2, f3, f4, f5, f6, f7, TTL, IH and TV_D.

The design data of the camera optical lens 10 in Embodiment 1 of the present disclosure are shown in Table 1.

TABLE 1

|  |  | R | d | nd | vd | effective radius (mm) |
|---|---|---|---|---|---|---|
| S1 | R1 | Infinity | d1 = 0.412 | nd1 1.544 | v1 56.03 | 1.758 |
| S2 | R2 | 12.0125 | d2 = 0.802 |  |  | 1.384 |
| STOP |  | Infinity | d3 = 0.152 |  |  | 0.784 |
| S3 | R3 | 29.2301 | d4 = 0.782 | nd2 1.544 | v2 56.03 | 0.913 |

TABLE 1-continued

|     |     | R        | d          |     | nd    | vd    | effective radius (mm) |
|-----|-----|----------|------------|-----|-------|-------|----------------------|
| S4  | R4  | −2.5152  | d5 = 0.066 |     |       |       | 1.214 |
| S5  | R5  | −9.4564  | d6 = 0.651 | nd3 | 1.544 | v3 56.03 | 1.421 |
| S6  | R6  | −9.3871  | d7 = 0.357 |     |       |       | 1.547 |
| S7  | R7  | −7.9856  | d8 = 0.350 | nd4 | 1.670 | v4 19.39 | 1.650 |
| S8  | R8  | −51.1684 | d9 = 0.184 |     |       |       | 1.818 |
| S9  | R9  | Infinity | d10 = 0.822 | nd5 | 1.544 | v5 56.03 | 2.025 |
| S10 | R10 | −2.44114 | d11 = 0.050 |     |       |       | 2.263 |
| S11 | R11 | 4.50532  | d12 = 0.428 | nd6 | 1.670 | v6 19.39 | 2.395 |
| S12 | R12 | 3.29178  | d13 = 0.399 |     |       |       | 3.170 |
| S13 | R13 | 1.24048  | d14 = 0.471 | nd7 | 1.615 | v7 25.94 | 3.536 |
| S14 | R14 | 0.88426  | d15 = 0.878 |     |       |       | 3.983 |
| S15 | R15 | Infinity | d16 = 0.210 | ndg | 1.517 | vg 64.20 | 4.900 |
| S16 | R16 | Infinity | d17 = 0.284 |     |       |       | 4.989 |

Reference wavelength = 587.5618 nm

Table 2 shows aspheric surface data of the object-side surfaces and the image-side surfaces of the first lens L1 to the sixth lens L6 and the object-side surface of the seventh lens L7 of the camera optical lens 10 in Embodiment 1 of the present disclosure.

TABLE 2

| | Conic coefficient | Aspheric surface coefficients | | | | |
|---|---|---|---|---|---|---|
| | k | A4 | A6 | A8 | A10 | A12 |
| S1  | 0.0000E+00  | 7.4429E−02  | −3.2052E−02 | 2.9280E−02  | −2.1986E−02 | 1.1530E−02  |
| S2  | 0.0000E+00  | 1.1088E−01  | −9.4936E−02 | 2.4985E−01  | −4.8946E−01 | 6.4156E−01  |
| S3  | 0.0000E+00  | −4.5434E−02 | −3.7749E−02 | 1.3033E−01  | −7.2405E−01 | 1.9519E+00  |
| S4  | 0.0000E+00  | 1.1427E−02  | −6.8694E−02 | −2.5018E−01 | 8.6204E−01  | −1.3994E+00 |
| S5  | 0.0000E+00  | 6.2586E−02  | −1.0720E−01 | −2.4404E−02 | 2.1611E−01  | −3.1292E−01 |
| S6  | 3.0692E+01  | −4.6500E−02 | 5.5766E−02  | −1.1126E−01 | 9.6868E−02  | −5.7495E−02 |
| S7  | 0.0000E+00  | −8.5027E−02 | −9.4933E−02 | 2.6859E−01  | −3.6063E−01 | 2.8791E−01  |
| S8  | 0.0000E+00  | 9.2296E−03  | −1.3691E−01 | 2.0446E−01  | −2.1103E−01 | 1.4442E−01  |
| S9  | 0.0000E+00  | 4.7649E−02  | 5.4402E−02  | −1.1683E−01 | 9.4318E−02  | −4.6877E−02 |
| S10 | −8.7258E+00 | −1.1365E−02 | 5.1570E−02  | −4.7266E−02 | 2.3069E−02  | −8.3189E−03 |
| S11 | 0.0000E+00  | 1.7976E−01  | −1.7608E−01 | 9.8596E−02  | −4.8451E−02 | 1.7728E−02  |
| S12 | 0.0000E+00  | 1.5629E−01  | −1.4337E−01 | 5.2184E−02  | −1.1551E−02 | 1.6719E−03  |
| S13 | −3.9288E+00 | −5.2502E−02 | −4.7600E−02 | 2.9395E−02  | −7.4807E−03 | 1.1015E−03  |

| | Conic coefficient | Aspheric surface coefficients | | | |
|---|---|---|---|---|---|
| | k | A14 | A16 | A18 | A20 |
| S1  | 0.0000E+00  | −3.3216E−03 | 2.8719E−04  | 8.4965E−05  | −1.7322E−05 |
| S2  | 0.0000E+00  | −5.2980E−01 | 2.6536E−01  | −7.3056E−02 | 8.3702E−03  |
| S3  | 0.0000E+00  | −3.1757E+00 | 2.9958E+00  | −1.4974E+00 | 2.9043E−01  |
| S4  | 0.0000E+00  | 1.3450E+00  | −7.8347E−01 | 2.5732E−01  | −3.7118E−02 |
| S5  | 0.0000E+00  | 2.3584E−01  | −9.8846E−02 | 2.1962E−02  | −2.0316E−03 |
| S6  | 3.0692E+01  | 2.0869E−02  | −2.6149E−03 | −6.3579E−04 | 1.7803E−04  |
| S7  | 0.0000E+00  | −1.3638E−01 | 3.7811E−02  | −5.7018E−03 | 3.6317E−04  |
| S8  | 0.0000E+00  | −6.0467E−02 | 1.4905E−02  | −1.9974E−03 | 1.1281E−04  |
| S9  | 0.0000E+00  | 1.5301E−02  | −3.1751E−03 | 3.7841E−04  | −1.9752E−05 |
| S10 | −8.7258E+00 | 2.2792E−03  | −4.0988E−04 | 4.0894E−05  | −1.6955E−06 |
| S11 | 0.0000E+00  | −4.2653E−03 | 6.2526E−04  | −5.0221E−05 | 1.6880E−06  |
| S12 | 0.0000E+00  | −1.5712E−04 | 9.0590E−06  | −2.8211E−07 | 3.3807E−09  |
| S13 | −3.9288E+00 | −1.0106E−04 | 5.7294E−06  | −1.8446E−07 | 2.5857E−09  |

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20} \quad (8)$$

Herein, k denotes a conic coefficient, A4, A6, A8, A10, A12, A14, A16, A18 and A20 denote aspheric surface coefficients, c denotes a central curvature of the optical surface, r denotes a vertical distance between a point in the aspheric curve and the optical axis, and z denotes an aspheric depth (i.e. a vertical distance between the point having a distance of x from the optical axis and a plane tangent to the vertex on the optical axis of the aspheric surface).

For convenience, an aspheric surface of each lens surface uses the aspheric surfaces shown in the above formula (8). However, the present disclosure is not limited to the aspherical polynomials form shown in the formula (8).

Table 3 shows the free-form surface data of the image-side surface of the seventh lens L7 of the camera optical lens 10 in Embodiment 1 of the present disclosure.

TABLE 3

| | Conic coefficient | Free-form surface coefficients | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| S14 | −2.6385 | −9.6790E−02 | −1.9317E−01 | −9.6763E−02 | 2.1500E−02 | 6.4297E−02 | 6.4446E−02 | 2.1499E−02 |
| | | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| S14 | | −1.8686E−03 | −7.4378E−03 | −1.1195E−02 | −7.4677E−03 | −1.8694E−03 | −1.1181E−04 | −5.6284E−04 | −1.1158E−03 |
| | | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| S14 | | −1.1213E−03 | −5.6057E−04 | −1.1176E−04 | 4.3860E−05 | 2.6324E−04 | 6.5734E−04 | 8.7692E−04 | 6.5835E−04 |
| | | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| S14 | | 2.6321E−04 | 4.3870E−05 | −4.6864E−06 | −3.2784E−05 | −9.8389E−05 | −1.6404E−04 | −1.6396E−04 | −9.8392E−05 |
| | | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| S14 | | −3.2797E−05 | −4.6881E−06 | 2.5869E−07 | 2.0689E−06 | 7.2457E−06 | 1.4487E−05 | 1.8112E−05 | 1.4474E−05 |
| | | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| S14 | | 7.2429E−06 | 2.0690E−06 | 2.5875E−07 | −7.4898E−09 | −6.7536E−08 | −2.6998E−07 | −6.2934E−07 | −9.4417E−07 |
| | | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| S14 | | −9.4417E−07 | −6.3027E−07 | −2.6932E−07 | −6.7417E−08 | −7.4884E−09 | 9.0219E−11 | 9.0869E−10 | 4.0697E−09 |
| | | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| S14 | | 1.0863E−08 | 1.8832E−08 | 2.2733E−08 | 1.9052E−08 | 1.0922E−08 | 4.0133E−09 | 9.0370E−10 | 9.0135E−11 |

$$z = \frac{cr^2}{1+\sqrt{1-(1+k)c^2r^2}} + \sum_{i=1}^{N} B_i E_i(x, y) \quad (9)$$

Herein, k denotes a conic coefficient, $B_i$ denotes free-form surface coefficients, c denotes a central curvature of the optical surface, r denotes a vertical distance between a point in the free-form surface and the optical axis, x denotes a component of r in x direction, y denotes a component of r in y direction, and z denotes an aspheric depth (i.e. a vertical distance between the point having a distance of x from the optical axis and a plane tangent to the vertex on the optical axis of the aspheric surface).

For convenience, a free-form surface of the image-side surface S14 of the seventh lens L7 uses the free-form surface shown in the above formula (9). However, the present disclosure is not limited to the polynomial form shown in the formula (9).

Table 4 shows values of 2ω, Fno, f, f1, f2, f3, f4, f5, f6, f7, TTL, IH and TV_D of the camera optical lens 10 in Embodiment 1 of the present disclosure.

TABLE 4

| | |
|---|---|
| 2ω (°) | 114.1 |
| Fno | 2.24 |
| f (mm) | 3.393 |
| f1 (mm) | −21.815 |
| f2 (mm) | 4.243 |
| f3 (mm) | 536.286 |
| f4 (mm) | −13.660 |
| f5 (mm) | 4.433 |
| f6 (mm) | −20.559 |
| f7 (mm) | −9.989 |
| TTL (mm) | 7.299 |
| IH (mm) | 5.200 |
| TV_D(%) | −0.06% |

In the subsequent Table 13, various parameters of Embodiments 1, 2 and 3, and values corresponding to the parameters specified in the above conditions (1) to (7) are shown.

As shown in Table 13, Embodiment 1 satisfies the conditions (1) to (7).

Figure 10:
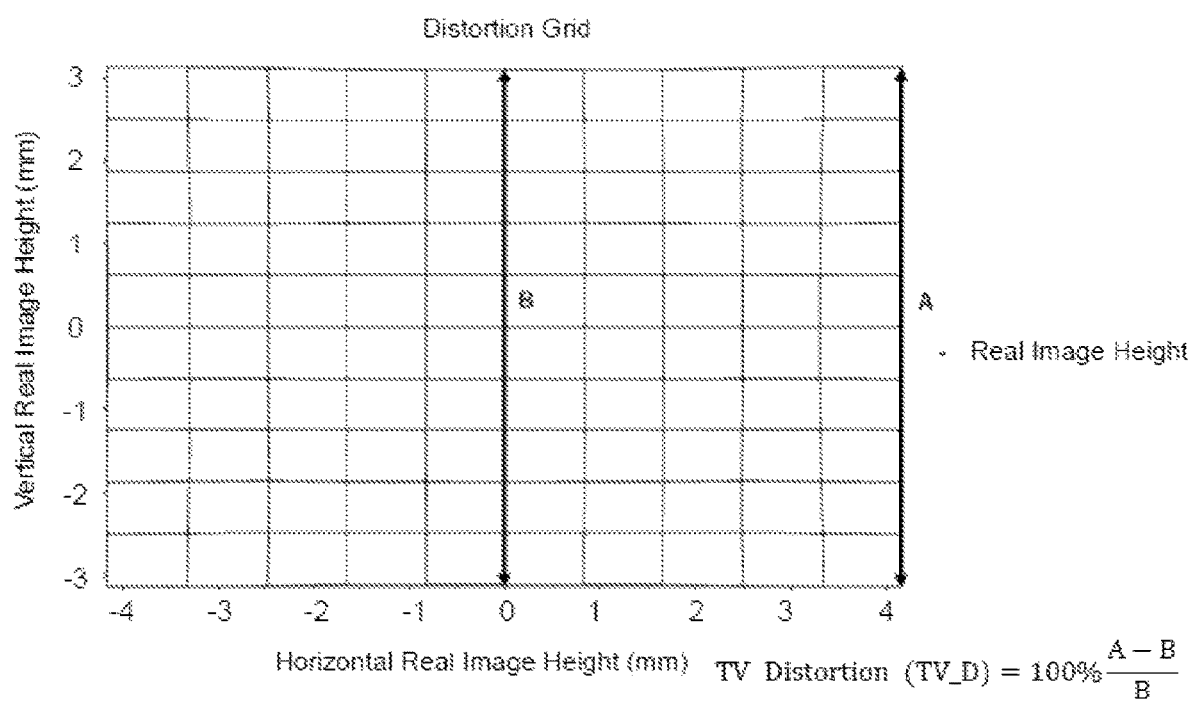
FIG. 10 is a schematic diagram showing calculation of a TV distortion.

FIG. 2 is a schematic diagram showing diameters of RMS spots in various image heights of the camera optical lens 10 according to Embodiment 1 of the present disclosure. FIG. 3 is a schematic diagram of a distortion grid. It can be seen that the camera optical lens 10 satisfies |TV_D|<1.0%, has excellent optical performance and is of wide angle. It should be noted that a calculation method for the TV_D is illustrated in FIG. 10.

Embodiment 2

Figure 4:
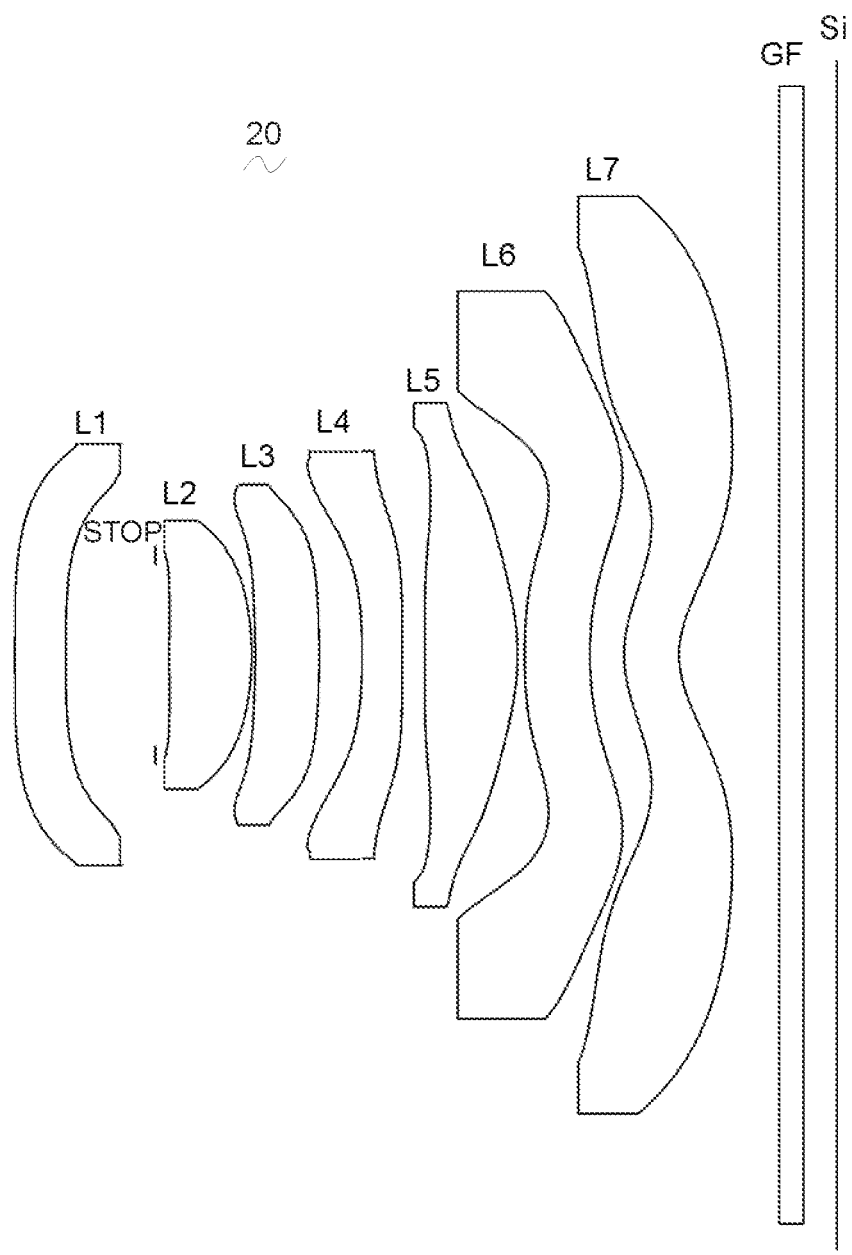
FIG. 4 is a schematic diagram of a structure of a camera optical lens according to Embodiment 2 of the present disclosure.

FIG. 4 is a schematic diagram of a structure of a camera optical lens 20 according to Embodiment 2 of the present disclosure. Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

Table 5 shows the central curvature radii R of the object-side surfaces and the image-side surfaces of the camera optical lens 20 of the first lens L1 to the seventh lens L7, the on-axis thicknesses d of the lenses, the on-axis distances d between the lenses, the refractive indices nd and the abbe numbers v. Table 6 shows the conic coefficients k and the aspheric surface coefficients of the surfaces S1 to S13. Table 7 shows the conic coefficient k and the free-form surface coefficients of the surface S14. Table 8 shows values of 2ω, Fno, f, f1, f2, f3, f4, f5, f6, f7, TTL, IH and TV_D.

TABLE 5

|  |  | R | d |  | nd | vd | effective radius (mm) |
|---|---|---|---|---|---|---|---|
| S1 | R1 | Infinity | d1 = | 0.445 | nd1 1.535 | v1 55.69 | 1.821 |
| S2 | R2 | 29.4411 | d2 = | 0.786 |  |  | 1.488 |
| STOP | S0 | Infinity | d3 = | 0.127 |  |  | 0.796 |
| S3 | R3 | 32.9251 | d4 = | 0.720 | nd2 1.544 | v2 56.03 | 0.909 |
| S4 | R4 | −2.3420 | d5 = | 0.030 |  |  | 1.176 |
| S5 | R5 | −7.2447 | d6 = | 0.559 | nd3 1.535 | v3 55.69 | 1.380 |
| S6 | R6 | −9.5194 | d7 = | 0.377 |  |  | 1.490 |
| S7 | R7 | −5.3404 | d8 = | 0.350 | nd4 1.670 | v4 19.39 | 1.608 |
| S8 | R8 | −111.8212 | d9 = | 0.198 |  |  | 1.785 |
| S9 | R9 | Infinity | d10 = | 0.812 | nd5 1.544 | v5 56.03 | 1.987 |
| S10 | R10 | −2.13631 | d11 = | 0.063 |  |  | 2.198 |
| S11 | R11 | 6.29850 | d12 = | 0.570 | nd6 1.670 | v6 19.39 | 2.311 |
| S12 | R12 | 3.32395 | d13 = | 0.298 |  |  | 3.183 |
| S13 | R13 | 1.09973 | d14 = | 0.481 | nd7 1.615 | v7 25.94 | 3.577 |
| S14 | R14 | 0.82171 | d15 = | 0.878 |  |  | 4.022 |
| S15 | R15 | Infinity | d16 = | 0.210 | ndg 1.517 | vg 64.20 | 4.941 |
| S16 | R16 | Infinity | d17 = | 0.293 |  |  | 5.030 |

Reference wavelength = 587.5618 nm

Table 6 shows aspheric surface data of each lens of the camera optical lens 20 in Embodiment 2 of the present disclosure.

TABLE 6

|  | Conic coefficient | Aspheric surface coefficients | | | | |
|---|---|---|---|---|---|---|
|  | k | A4 | A6 | A8 | A10 | A12 |
| S1 | 0.0000E+00 | 5.6075E−02 | −2.0086E−02 | 2.2385E−02 | −2.0581E−02 | 1.2400E−02 |
| S2 | 0.0000E+00 | 8.3985E−02 | −4.0851E−02 | 9.9633E−02 | −2.0912E−01 | 2.8263E−01 |
| S3 | 0.0000E+00 | −5.3025E−02 | 7.0109E−02 | −5.8243E−01 | 1.9787E+00 | −4.1576E+00 |
| S4 | 0.0000E+00 | 8.6654E−02 | −3.9504E−01 | 6.3906E−01 | −9.3717E−01 | 1.3058E+00 |
| S5 | 0.0000E+00 | 1.4149E−01 | −4.6254E−01 | 8.3140E−01 | −1.1872E+00 | 1.2656E+00 |
| S6 | 3.0870E+01 | −2.4966E−02 | 1.0290E−02 | −5.3788E−02 | 3.7773E−02 | −2.2784E−02 |
| S7 | 0.0000E+00 | −6.5390E−02 | −1.6719E−01 | 4.4475E−01 | −6.0977E−01 | 5.0216E−01 |
| S8 | 0.0000E+00 | −9.7575E−03 | −1.9499E−01 | 3.7241E−01 | −4.1993E−01 | 2.9581E−01 |
| S9 | 0.0000E+00 | 2.2421E−02 | 5.9868E−02 | −1.0416E−01 | 7.9129E−02 | −3.8935E−02 |
| S10 | −8.8492E+00 | −3.4818E−02 | 1.1235E−01 | −1.4132E−01 | 1.0029E−01 | −4.6015E−02 |
| S11 | 0.0000E+00 | 1.7437E−01 | −1.8602E−01 | 1.1553E−01 | −6.0589E−02 | 2.2964E−02 |
| S12 | 0.0000E+00 | 8.8210E−02 | −9.2945E−02 | 3.2065E−02 | −6.5741E−03 | 8.7532E−04 |
| S13 | −3.7947E+00 | −8.0559E−02 | −2.7214E−02 | 2.1120E−02 | −5.3738E−03 | 7.5729E−04 |

|  | Conic coefficient | Aspheric surface coefficients | | | |
|---|---|---|---|---|---|
|  | k | A14 | A16 | A18 | A20 |
| S1 | 0.0000E+00 | −4.2622E−03 | 7.2283E−04 | −2.6540E−05 | −4.9172E−06 |
| S2 | 0.0000E+00 | −2.2878E−01 | 1.0864E−01 | −2.7715E−02 | 2.8992E−03 |
| S3 | 0.0000E+00 | 5.0585E+00 | −3.2519E+00 | 7.2605E−01 | 1.0914E−01 |
| S4 | 0.0000E+00 | −1.4905E+00 | 1.1282E+00 | −4.8259E−01 | 8.7589E−02 |
| S5 | 0.0000E+00 | −9.4054E−01 | 4.4654E−01 | −1.1832E−01 | 1.3126E−02 |
| S6 | 3.0870E+01 | 1.4694E−02 | −6.3817E−03 | 1.4176E−03 | −9.2427E−05 |
| S7 | 0.0000E+00 | −2.5036E−01 | 7.4822E−02 | −1.2463E−02 | 8.9649E−04 |
| S8 | 0.0000E+00 | −1.2805E−01 | 3.3179E−02 | −4.7380E−03 | 2.8758E−04 |
| S9 | 0.0000E+00 | 1.3030E−02 | −2.8078E−03 | 3.4640E−04 | −1.8561E−05 |
| S10 | −8.8492E+00 | 1.3567E−02 | −2.4332E−03 | 2.3972E−04 | −9.9326E−06 |
| S11 | 0.0000E+00 | −5.6748E−03 | 8.4534E−04 | −6.7376E−05 | 2.1534E−06 |
| S12 | 0.0000E+00 | −7.3454E−05 | 3.4226E−06 | −5.9375E−08 | −5.4397E−10 |
| S13 | −3.7947E+00 | −6.5082E−05 | 3.4029E−06 | −9.9684E−08 | 1.2549E−09 |

Table 7 shows the free-form surface data of the image-side surface of the seventh lens L7 of the camera optical lens 20 in Embodiment 2 of the present disclosure.

TABLE 7

| | Conic coefficient | Free-form surface coefficients | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| S14 | −2.9775 | −9.3301E−02 | −1.8656E−01 | −9.3165E−02 | 2.1300E−02 | 6.3872E−02 | 6.3893E−02 | 2.1267E−02 |
| | | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| S14 | | −1.8714E−03 | −7.4818E−03 | −1.1238E−02 | −7.4832E−03 | −1.8689E−03 | −1.1172E−04 | −5.5928E−04 | −1.1147E−03 |
| | | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| S14 | | −1.1167E−03 | −5.5789E−04 | −1.1165E−04 | 4.3867E−05 | 2.6324E−04 | 6.5780E−04 | 8.7722E−04 | 6.5813E−04 |
| | | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| S14 | | 2.6298E−04 | 4.3865E−05 | −4.6855E−06 | −3.2794E−05 | −9.8405E−05 | −1.6398E−04 | −1.6404E−04 | −9.8397E−05 |
| | | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| S14 | | −3.2791E−05 | −4.6870E−06 | 2.5865E−07 | 2.0691E−06 | 7.2428E−06 | 1.4486E−05 | 1.8109E−05 | 1.4481E−05 |
| | | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| S14 | | 7.2469E−06 | 2.0689E−06 | 2.5873E−07 | −7.4903E−09 | −6.7460E−08 | −2.6960E−07 | −6.2929E−07 | −9.4356E−07 |
| | | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| S14 | | −9.4386E−07 | −6.2822E−07 | −2.7034E−07 | −6.7293E−08 | −7.4897E−09 | 9.0272E−11 | 9.0526E−10 | 4.0605E−09 |
| | | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| S14 | | 1.0831E−08 | 1.8955E−08 | 2.2700E−08 | 1.8996E−08 | 1.0769E−08 | 1.0769E−08 | 8.9739E−10 | 9.0211E−11 |

Table 8 shows values of 2ω, Fno, f, f1, f2, f3, f4, f5, f6, f7, TTL, IH and TV_D of the camera optical lens 20 in Embodiment 2 of the present disclosure.

TABLE 8

| 2ω (°) | 112.3 |
|---|---|
| Fno | 2.24 |
| f (mm) | 3.523 |
| f1 (mm) | −54.385 |
| f2 (mm) | 4.000 |
| f3 (mm) | −61.300 |
| f4 (mm) | −8.080 |
| f5 (mm) | 3.880 |
| f6 (mm) | −10.991 |
| f7 (mm) | −15.614 |
| TTL (mm) | 7.205 |
| IH (mm) | 5.200 |
| TV_D(%) | −0.67% |

As shown in Table 13, Embodiment 2 satisfies the conditions (1) to (7).

Figure 5:
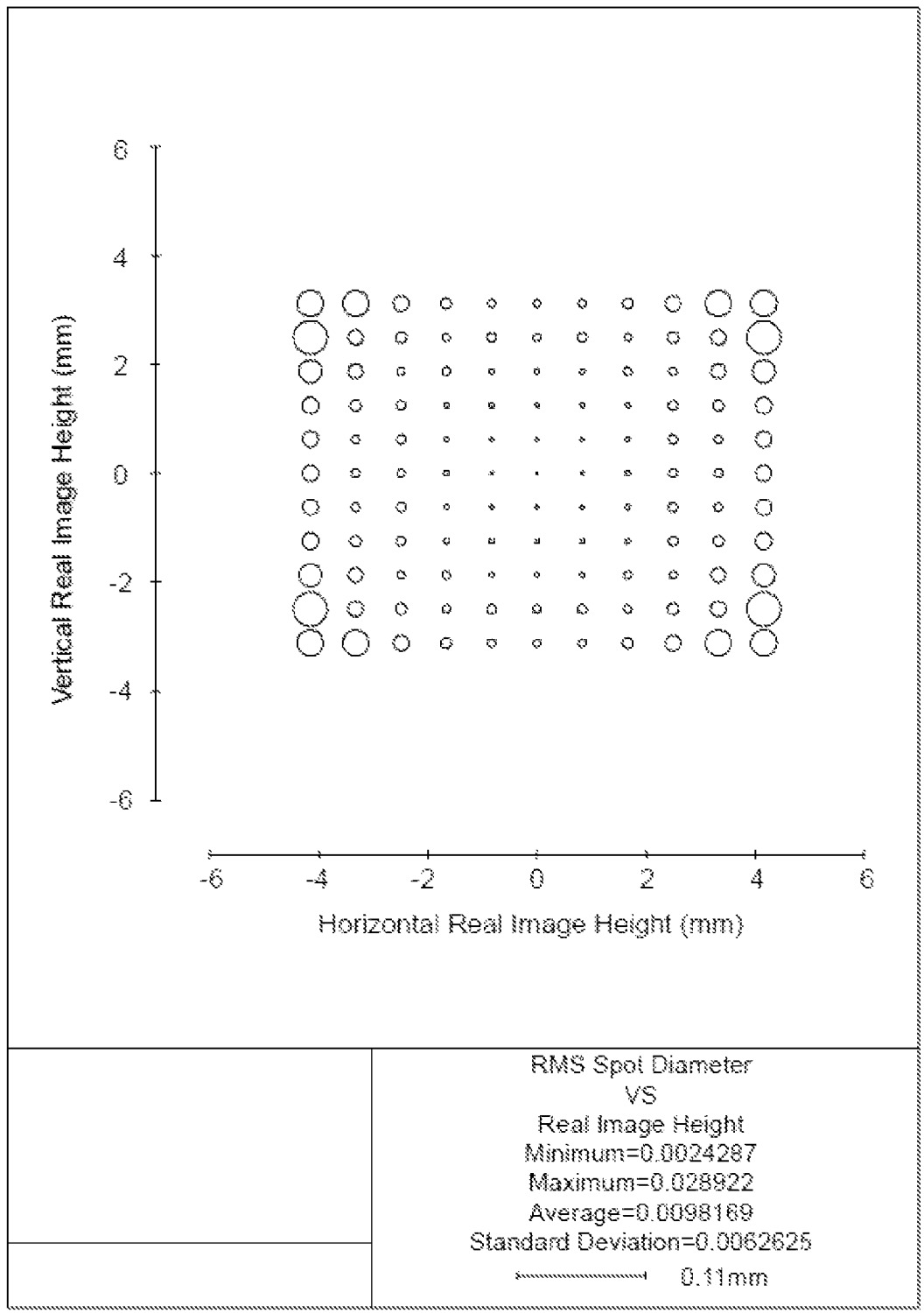
FIG. 5 is a schematic diagram showing diameters of RMS spots in various image heights of the camera optical lens according to Embodiment 2 of the present disclosure.
Figure 6:
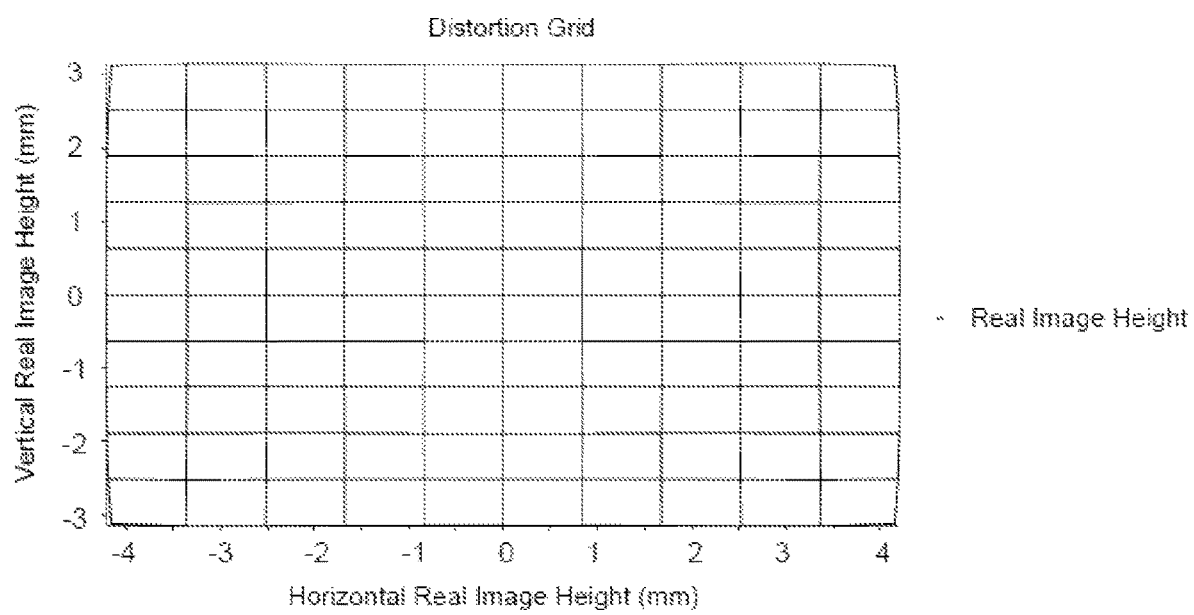
FIG. 6 is a schematic diagram of a distortion grid of the camera optical lens according to Embodiment 2 of the present disclosure.

FIG. 5 is a schematic diagram showing diameters of RMS spots in various image heights of the camera optical lens 20 according to Embodiment 2 of the present disclosure. FIG. 6 is a schematic diagram of a distortion grid. It can be seen that the camera optical lens 20 satisfies |TV_D|<1.0%, has excellent optical performance and is of wide angle.

Embodiment 3

Figure 7:
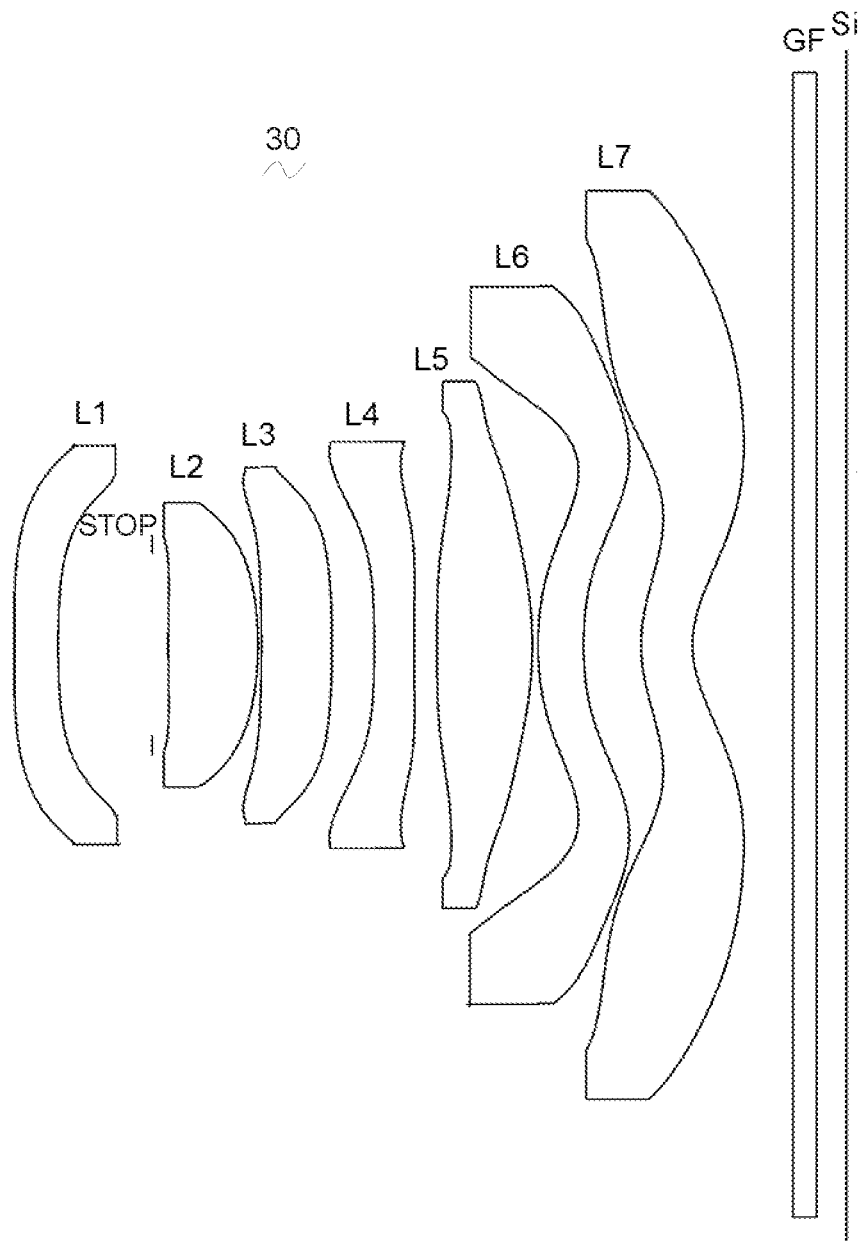
FIG. 7 is a schematic diagram of a structure of a camera optical lens according to Embodiment 3 of the present disclosure.

FIG. 7 is a schematic diagram of a structure of a camera optical lens 30 according to Embodiment 3 of the present disclosure. Embodiment 3 is basically the same as Embodiment 1 and involves symbols having the same meanings as Embodiment 1, and only differences therebetween will be described in the following.

Table 9 and Table 10 show design data of a camera optical lens 30 in Embodiment 3 of the present disclosure.

Table 9 shows the central curvature radii R of the object-side surfaces and the image-side surfaces of the camera optical lens 30 of the first lens L1 to the seventh lens L7, the on-axis thicknesses d of the lenses, the on-axis distances d between the lenses, the refractive indices nd and the abbe numbers v. Table 10 shows the conic coefficients k and the aspheric surface coefficients of the surfaces S1 to S13. Table 11 shows the conic coefficient k and the free-form surface coefficients of the surface S14. Table 12 shows values of 2ω, Fno, f, f1, f2, f3, f4, f5, f6, f7, TTL, ID and TV_D.

TABLE 9

| | | R | d | nd | vd | effective radius (mm) |
|---|---|---|---|---|---|---|
| S1 | R1 | Infinity | d1 = 0.384 | nd1 1.544 | v1 56.03 | 1.738 |
| S2 | R2 | 11.3375 | d2 = 0.821 | | | 1.388 |
| STOP | S0 | Infinity | d3 = 0.143 | | | 0.801 |

TABLE 9-continued

|  |  | R | d |  | nd |  | vd | effective radius (mm) |
|---|---|---|---|---|---|---|---|---|
| S3 | R3 | 16.2347 | d4 = | 0.785 | nd2 | 1.535 v2 | 55.69 | 0.936 |
| S4 | R4 | −2.6971 | d5 = | 0.031 |  |  |  | 1.246 |
| S5 | R5 | −10.1404 | d6 = | 0.616 | nd3 | 1.544 v3 | 56.03 | 1.449 |
| S6 | R6 | −10.0176 | d7 = | 0.370 |  |  |  | 1.548 |
| S7 | R7 | −12.3457 | d8 = | 0.350 | nd4 | 1.670 v4 | 19.39 | 1.656 |
| S8 | R8 | 45.6188 | d9 = | 0.201 |  |  |  | 1.781 |
| S9 | R9 | Infinity | d10 = | 0.832 | nd5 | 1.544 v5 | 56.03 | 2.043 |
| S10 | R10 | −3.55833 | d11 = | 0.050 |  |  |  | 2.303 |
| S11 | R11 | 2.75350 | d12 = | 0.400 | nd6 | 1.670 v6 | 19.39 | 2.418 |
| S12 | R12 | 3.35128 | d13 = | 0.502 |  |  |  | 3.136 |
| S13 | R13 | 1.37438 | d14 = | 0.450 | nd7 | 1.615 v7 | 25.94 | 3.551 |
| S14 | R14 | 0.91063 | d15 = | 0.878 |  |  |  | 3.966 |
| S15 | R15 | Infinity | d16 = | 0.210 | ndg | 1.517 vg | 64.20 | 4.910 |
| S16 | R16 | Infinity | d17 = | 0.261 |  |  |  | 5.001 |

Reference wavelength = 587.5618 nm

Table 10 shows aspheric surface data of each lens of the camera optical lens 30 in Embodiment 3 of the present disclosure.

TABLE 10

|  | Conic coefficient | Aspheric surface coefficients | | | | |
|---|---|---|---|---|---|---|
|  | k | A4 | A6 | A8 | A10 | A12 |
| S1 | 0.0000E+00 | 7.9705E−02 | −4.1812E−02 | 4.8785E−02 | −4.7619E−02 | 3.2787E−02 |
| S2 | 0.0000E+00 | 1.1378E−01 | −9.9048E−02 | 2.6003E−01 | −5.0984E−01 | 6.6826E−01 |
| S3 | 0.0000E+00 | −4.3338E−02 | −2.7617E−02 | 1.1286E−02 | −9.4678E−02 | 7.1110E−02 |
| S4 | 0.0000E+00 | 4.8592E−02 | −2.4369E−01 | 1.4000E−01 | 2.7391E−01 | −7.5597E−01 |
| S5 | 0.0000E+00 | 9.7252E−02 | −2.7184E−01 | 3.3679E−01 | −2.9166E−01 | 1.7257E−01 |
| S6 | 3.2489E+01 | −3.8008E−02 | 2.7842E−02 | −5.5973E−02 | 2.8600E−02 | −2.0539E−03 |
| S7 | 0.0000E+00 | −5.9805E−02 | −1.5179E−01 | 3.1442E−01 | −3.4827E−01 | 2.4180E−01 |
| S8 | 0.0000E+00 | 4.8507E−02 | −2.3055E−01 | 3.0106E−01 | −2.6198E−01 | 1.5714E−01 |
| S9 | 0.0000E+00 | 9.7373E−02 | −3.8954E−02 | −2.6656E−02 | 4.0623E−02 | −2.5747E−02 |
| S10 | −6.0879E+00 | −6.0521E−02 | 1.2914E−01 | −1.1591E−01 | 6.4195E−02 | −2.4856E−02 |
| S11 | −3.7834E+00 | 1.0590E−01 | −6.9545E−02 | 7.8939E−03 | 3.9228E−03 | −2.0675E−03 |
| S12 | 6.3893E−02 | 1.7695E−01 | −1.6481E−01 | 6.6017E−02 | −1.7098E−02 | 3.0193E−03 |
| S13 | −4.8279E+00 | −5.2025E−02 | −4.6439E−02 | 2.8165E−02 | −6.9781E−03 | 9.9723E−04 |

|  | Conic coefficient | Aspheric surface coefficients | | | |
|---|---|---|---|---|---|
|  | k | A14 | A16 | A18 | A20 |
| S1 | 0.0000E+00 | −1.4344E−02 | 3.7438E−03 | −5.1208E−04 | 2.5921E−05 |
| S2 | 0.0000E+00 | −5.5272E−01 | 2.7773E−01 | −7.6887E−02 | 8.8877E−03 |
| S3 | 0.0000E+00 | 2.4837E−01 | −7.1077E−01 | 6.8887E−01 | −2.4533E−01 |
| S4 | 0.0000E+00 | 8.5540E−01 | −5.4037E−01 | 1.8634E−01 | −2.7626E−02 |
| S5 | 0.0000E+00 | −6.8308E−02 | 1.8337E−02 | −3.0382E−03 | 2.2453E−04 |
| S6 | 3.2489E+01 | −8.2688E−03 | 6.8493E−03 | −2.4125E−03 | 3.3248E−04 |
| S7 | 0.0000E+00 | −1.0349E−01 | 2.6516E−02 | −3.7397E−03 | 2.2398E−04 |
| S8 | 0.0000E+00 | −6.0863E−02 | 1.4407E−02 | −1.8991E−03 | 1.0735E−04 |
| S9 | 0.0000E+00 | 9.7278E−03 | −2.2137E−03 | 2.7915E−04 | −1.5053E−05 |
| S10 | −6.0879E+00 | 6.5847E−03 | −1.0971E−03 | 1.0159E−04 | −3.9605E−06 |
| S11 | −3.7834E+00 | 4.5649E−04 | −5.5343E−05 | 3.8184E−06 | −1.2657E−07 |
| S12 | 6.3893E−02 | −3.5506E−04 | 2.6275E−05 | −1.0990E−06 | 1.9684E−08 |
| S13 | −4.8279E+00 | −8.8803E−05 | 4.8966E−06 | −1.5384E−07 | 2.1121E−09 |

Table 11 shows the free-form surface data of the image-side surface of the seventh lens L7 of the camera optical lens 30 in Embodiment 3 of the present disclosure.

TABLE 7

| | Conic coefficient | Free-form surface coefficients | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| S14 | −2.7337 | −9.6055E−02 | −1.9210E−01 | −9.6038E−02 | 2.1397E−02 | 6.4204E−02 | 6.4253E−02 | 2.1392E−02 |
| | | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| S14 | | −1.8667E−03 | −7.4634E−03 | −1.1263E−02 | −7.4610E−03 | −1.8657E−03 | −1.1200E−04 | −5.6216E−04 | −1.1039E−03 |
| | | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| S14 | | −1.1165E−03 | −5.6333E−04 | −1.1221E−04 | 4.3869E−05 | 2.6328E−04 | 6.5640E−04 | 8.7610E−04 | 6.5822E−04 |
| | | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| S14 | | 2.6330E−04 | 4.3896E−05 | −4.6858E−06 | −3.2777E−05 | −9.8287E−05 | −1.6398E−04 | −1.6385E−04 | −9.8371E−05 |
| | | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| S14 | | −3.2774E−05 | −4.6876E−06 | 2.5875E−07 | 2.0693E−06 | 7.2430E−06 | 1.4480E−05 | 1.811OE−O5 | 1.4483E−05 |
| | | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| S14 | | 7.2434E−06 | 2.0695E−06 | 2.5880E−07 | −7.4871E−09 | −6.7516E−08 | −2.7005E−07 | −6.2805E−07 | −9.4072E−07 |
| | | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| S14 | | −9.4567E−07 | −6.3044E−07 | −2.6949E−07 | −6.7550E−08 | −7.4865E−09 | 8.9839E−11 | 9.0468E−10 | 4.0661E−09 |
| | | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| S14 | | 1.0797E−08 | 1.8659E−08 | 2.2713E−08 | 1.9003E−08 | 1.0905E−08 | 4.0160E−09 | 9.0579E−10 | 8.9794E−11 |

Table 12 shows values of 2ω, Fno, f, f1, f2, f3, f4, f5, f6, f7, TTL, IH and TV_D of the camera optical lens 30 in Embodiment 3 of the present disclosure.

TABLE 12

| 2ω (°) | 112.6 |
|---|---|
| Fno | 2.24 |
| f (mm) | 3.461 |
| f1 (mm) | −20.589 |
| f2 (mm) | 4.336 |
| f3 (mm) | 540.032 |
| f4 (mm) | −13.946 |
| f5 (mm) | 6.462 |
| f6 (mm) | 17.429 |
| f7 (mm) | −6.839 |
| TTL (mm) | 7.284 |
| IH (mm) | 5.200 |
| TV_D(%) | 0.89% |

As shown in Table 13, Embodiment 3 satisfies the conditions (1) to (7).

Figure 8:
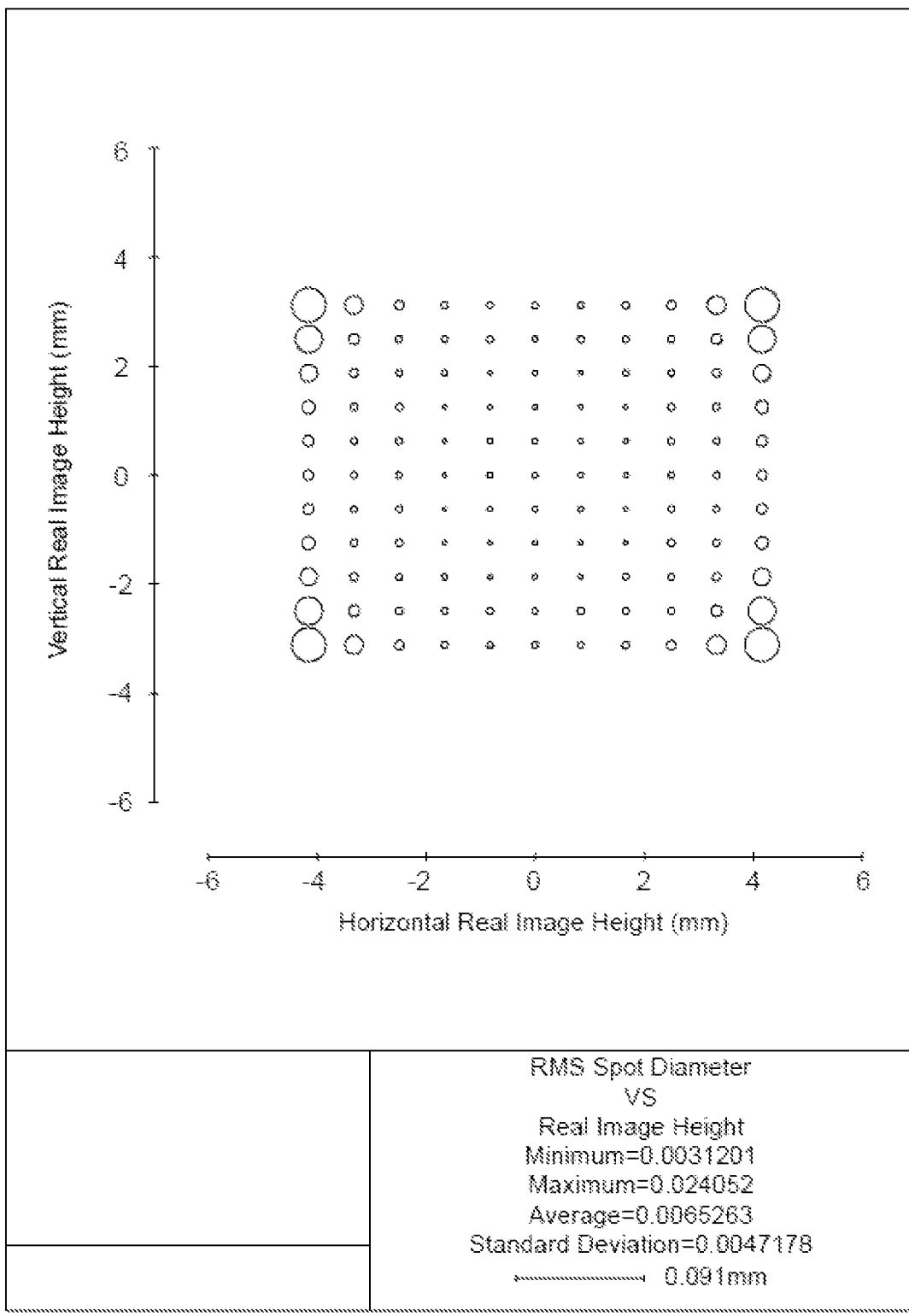
FIG. 8 is a schematic diagram showing diameters of RMS spots in various image heights of the camera optical lens according to Embodiment 3 of the present disclosure.
Figure 9:
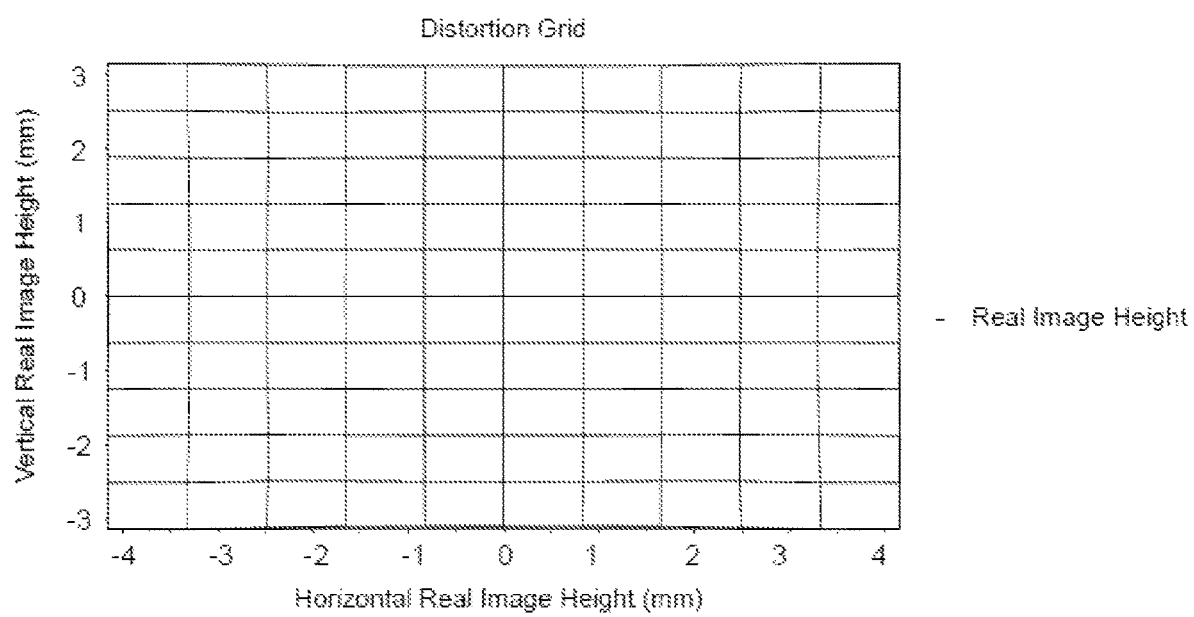
FIG. 9 is a schematic diagram of a distortion grid of the camera optical lens according to Embodiment 3 of the present disclosure.

FIG. 8 is a schematic diagram showing diameters of RMS spots in various image heights of the camera optical lens 30 according to Embodiment 3 of the present disclosure. FIG. 9 is a schematic diagram of a distortion grid. It can be seen that the camera optical lens 30 satisfies |TV_D|<1.0%, has excellent optical performance and is of wide angle.

Table 13 shows various parameters of Embodiments 1, 2 and 3, and values corresponding to the parameters specified in the above conditions (1) to (7).

TABLE 13

| | Embodiment 1 | Embodiment 2 | Embodiment 3 |
|---|---|---|---|
| |f2/f3| | 0.008 | 0.065 | 0.008 |
| f2/f4 | −0.311 | −0.495 | −0.311 |
| D12/f | 0.633 | 0.590 | 0.616 |
| D23/f | 0.442 | 0.372 | 0.414 |
| f7/f | −2.944 | −4.432 | −1.976 |
| v1/v2 | 1.000 | 0.994 | 1.006 |
| v3/v2 | 1.000 | 0.994 | 1.006 |

It will be understood by those of ordinary skill in the art that the embodiments described above are specific embodiments realizing the present disclosure, and that in practical applications, various changes may be made thereto in form and in detail without departing from the range and scope of the disclosure.

What is claimed is:

1. A camera optical lens comprising, from an object side to an image side in sequence: a first lens having a negative refractive power, a second lens having a positive refractive power, a third lens, a fourth lens having a negative refractive power, a fifth lens having a positive refractive power, a sixth lens, a seventh lens having a negative refractive power and provided with an image-side surface as a free-form surface; wherein the camera optical lens satisfies conditions of:

|f2/f3|≤0.07;

−0.50≤f2/f4≤−0.30;

0.58≤D12/f≤0.64; and 0.35≤D23/f≤0.45; and where
f denotes a focal length of the camera optical lens;
f2 denotes a focal length of the second lens;
f3 denotes a focal length of the third lens;
f4 denotes a focal length of the fourth lens;
D12 denotes an on-axis distance from an object-side surface of the first lens to an image-side surface of the second lens; and
D23 denotes an on-axis distance from an object-side surface of the second lens to an image-side surface of the third lens.

2. The camera optical lens according to claim 1, wherein the camera optical lens further satisfies a condition of:
$-4.50 \leq f7/f \leq -1.90$;
where
f7 denotes a focal length of the seventh lens.

3. The camera optical lens according to claim 1, wherein the camera optical lens further satisfies a condition of:
$0.90 \leq v1/v2 \leq 1.10$;
where
v1 denotes an abbe number of the first lens; and
v2 denotes an abbe number of the second lens.

4. The camera optical lens according to claim 1, wherein the camera optical lens further satisfies a condition of:
$0.90 \leq v3/v2 \leq 1.10$;
where
v3 denotes an abbe number of the third lens; and
v2 denotes the abbe number of the second lens.

* * * * *